US012073001B1

(12) United States Patent
Mico et al.

(10) Patent No.: US 12,073,001 B1
(45) Date of Patent: Aug. 27, 2024

(54) ADVANCED DEIDENTIFICATION OF INFORMATION, SUCH AS INFORMATION ABOUT A PERSON

(71) Applicant: Providence St. Joseph Health, Renton, WA (US)

(72) Inventors: Lindsay Thomas Mico, Portland, OR (US); Vivek Tomer, Lake Oswego, OR (US); Yuqing Guo, Amherst, MA (US); Amar Nadaa Taiyab, Encinitas, CA (US)

(73) Assignee: Providence St. Joseph Health, Renton, WA (US)

( * ) Notice: Subject to any disclaimer, the term of this patent is extended or adjusted under 35 U.S.C. 154(b) by 0 days.

(21) Appl. No.: 18/612,921

(22) Filed: Mar. 21, 2024

(51) Int. Cl.
*G06F 21/62* (2013.01)
*G06F 40/284* (2020.01)

(52) U.S. Cl.
CPC ........ *G06F 21/6254* (2013.01); *G06F 40/284* (2020.01)

(58) Field of Classification Search
CPC .................................................. G06F 21/6254
See application file for complete search history.

(56) References Cited

U.S. PATENT DOCUMENTS

| | | | |
|---|---|---|---|
| 10,990,698 B2* | 4/2021 | Postnikov | H04L 9/0897 |
| 11,127,403 B2* | 9/2021 | Medalion | G06F 40/30 |
| 11,249,710 B2* | 2/2022 | Li | G06F 9/547 |
| 11,741,103 B1* | 8/2023 | MacManus | G06F 16/2255 707/715 |
| 11,757,626 B1* | 9/2023 | Rivlin | H04L 9/3213 713/171 |
| 11,983,145 B2* | 5/2024 | Hines | G06F 40/166 |
| 2021/0019374 A1* | 1/2021 | Donaldson | G06N 3/045 |
| 2022/0207229 A1* | 6/2022 | Perkins | G06F 40/30 |
| 2023/0222288 A1* | 7/2023 | Zhang | G06F 40/216 704/9 |
| 2023/0376858 A1* | 11/2023 | Tal | G06N 20/20 |
| 2024/0004623 A1* | 1/2024 | Groenewegen | G06F 11/3608 |
| 2024/0012885 A1* | 1/2024 | Sneider | G06F 21/128 |

OTHER PUBLICATIONS

Brown et al., "Interval Estimation for a Binomial Proportion," *Statistical Science* 16(2):101-133, May 2001. (33 pages).

(Continued)

*Primary Examiner* — Viral S Lakhia
(74) *Attorney, Agent, or Firm* — Seed Intellectual Property Law Group LLP

(57) ABSTRACT

A facility for the identifying contents of a data object is described. The facility identifies in the data object two or more constituent portions. For each of the constituent portions identified in the data object, the facility: identifies a type of data items occurring within the constituent portion; on the basis of the identified data item type, selects a deidentification operation; and causes the selected deidentification operation to be performed on the data items of the constituent portion, such that these data items are modified to make the data items less identifiable with a person, and/or less-harmfully identifiable with a person. After the causing, the facility assembles the constituent portions containing the modified data items into a modified version of the data object.

22 Claims, 5 Drawing Sheets

(56) References Cited

OTHER PUBLICATIONS

Chiu et al., "Named Entity Recognition with Bidirectional LSTM-CNNs," *Transactions of the Association for Computational Linguistics* 4:357-370, Jul. 2016. (14 pages).

Cochran, "Sampling Techniques, third edition," John Wiley & Sons, Inc., New York, Feb. 1977. (442 pages).

Dernoncourt et al., "De-identification of patient notes with recurrent neural networks," *Journal of the American Medical Informatics Association* 24(3):596-606, Dec. 31, 2016. (11 pages).

Douglass et al., "Computer-Assisted De-Identification of Free Text in the MIMIC II Database," *Computers in Cardiology* 31:341-344, Sep. 19, 2004. (4 pages).

Emam et al., "Anonymizing Health Data: Case Studies and Methods to Get You Started," O'Reilly Media, Inc. Sebastopol, CA, Aug. 13, 2014. (228 pages).

Ferrández et al., "Evaluating current automatic de-identification methods with Veteran's health administration clinical documents," *Medical Research Methodology* 12(109):1-16, Jul. 27, 2012. (16 pages).

Hyndman, "Computing and Graphing Highest Density Regions," *The American Statistician* 50(2):120-126, May 1996. (7 pages).

Khin et al., "A Deep Learning Architechture for De-identification of Patient Notes: Implementation and Evaluation," Oct. 3, 2018, URL=arxiv.org/abs/1810.01570, downloaded on Feb. 21, 2024. (15 pages).

Kocaman et al., "Accurate Clinical and Biomedical Named Entity Recognition at Scale," *Software Impacts* 13(100373), Jul. 11, 2022. (7 pages).

Liu et al., "De-identification of Clinical Notes via Recurrent Neural Network and Conditional Random Field," J Biomed Inform 75(S34-S42), Nov. 2017 (HHS Public Access Author Manuscript, available in PMC Nov. 1, 2018). (27 pages).

Lu et al., "Analysis of regression confidence intervals and Bayesian credible intervals for uncertainty quantification," *Water Resources Research* 48(9):1-20, Sep. 14, 2012. (20 pages).

Snedecor et al., "Statistical Methods, Eighth Edition," Iowa State University Press, Ames, Iowa, 1989. (536 pages).

Wright, "A Simple Method of Exact Optimal Sample Allocation under Stratification with Any Mixed Constraint Patterns," Center for Statistical Research & Methodology, Research Report Series (Statistics #2014-07), Aug. 21, 2014. (13 pages).

\* cited by examiner

ADVANCED DEIDENTIFICATION OF INFORMATION, SUCH AS INFORMATION ABOUT A PERSON

BACKGROUND

Computers are used to gather, store, and process a variety of information. As one example, healthcare organizations very commonly possess information about the patients they treat. This can include, for example, identifying information; contact information; demographic information; insurance information; testing, diagnosis, and treatment history; correspondence; etc.

DETAILED DESCRIPTION

Figure 1:
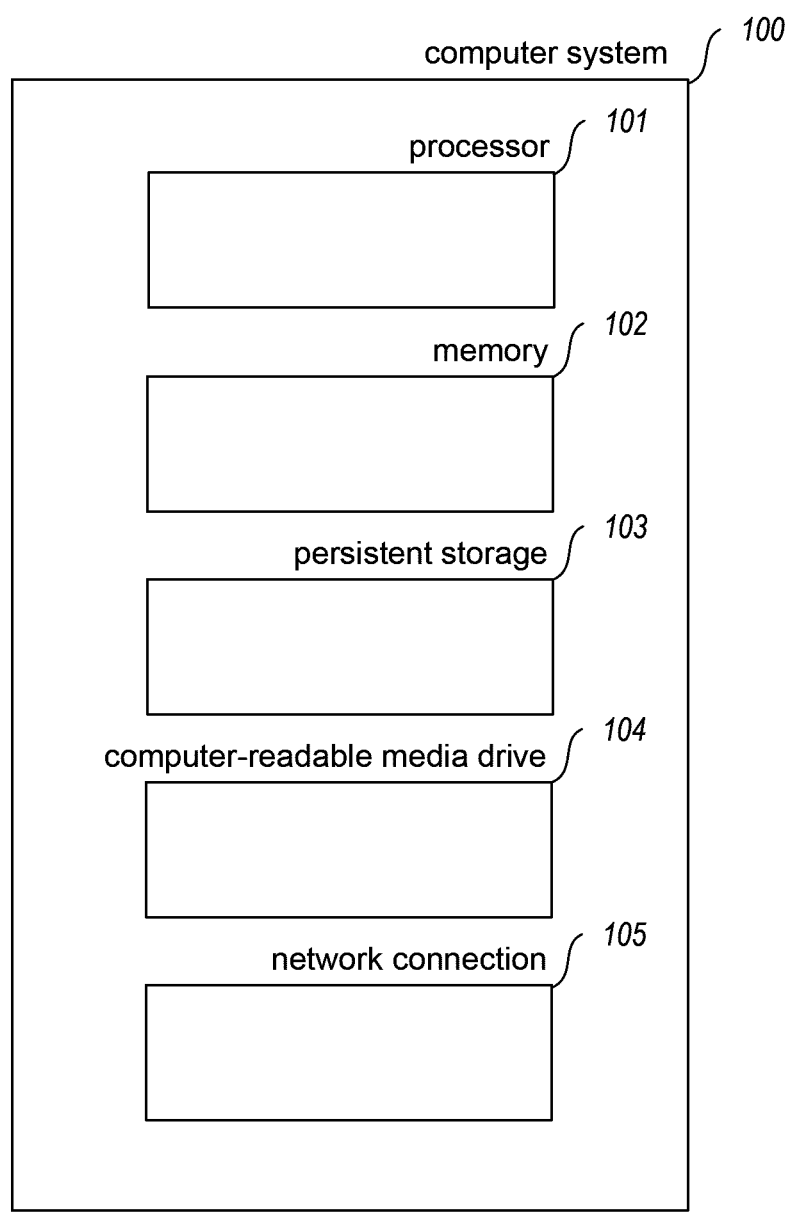
FIG. 1 is a block diagram showing some of the components typically incorporated in at least some of the computer systems and other devices on which the facility operates.

The inventors have observed that those who have an interest in information stored by computers-such as people identified by the information, or those described by the information-feel widely-varying levels of concern about its possession, use, and dissemination by computers.

For example, many forms of patient information possessed by healthcare organizations have levels of sensitivity toward the higher end of this range. This higher sensitivity can be based on factors such as the Health Insurance Portability and Accountability Act ("HIPAA") and other forms of external regulation, as well as the organization's recognition that patients' confidence in and comfort with an organization and its people is tied to how the organization manages certain aspects of patient information.

Conventional approaches to managing sensitive information about a person such as a patient involve (1) maintaining tight control over access to the information; (2) severely limiting the information collected and stored, and deleting it as quickly as possible; and (3) altering the personal information in ways that make it less identifiable with the person, or less-harmfully identifiable with the person, such as making it less specific.

The inventors have recognized significant disadvantages in the conventional approaches. They have determined that the first and second conventional approaches preclude many of the beneficial purposes for which the personal information can be used, such as performing studies about patient populations, use by a wide variety of caregivers to provide better-customized care to the person, etc. Relative to the third conventional approach, they have recognized that the alterations performed are often (a) inadequate, in the sense of maintaining the information in forms in which it is still identifiable with the person it describes, and/or overly specific; (b) irreversible, in the sense that the information cannot later be reassociated with the person or have its accuracy and fidelity at least partially restored, by a trusted entity that has a reasonable basis for doing so; and/or (c) computationally expensive, limiting the number of people whose information can be processed using a reasonable level of computing resources.

In response to recognizing these disadvantages of conventional approaches, the inventors have conceived and reduced to practice a software and/or hardware facility for advanced deidentification of information, such as information about a person ("the facility").

In some embodiments, the facility receives a series of data objects whose contents are to be deidentified, such as tables organized into rows and columns or long strings of unstructured free text. The facility determines a data type for each of a number of constituent portions of the data object, such as columns of the table. In various embodiments, data type may relate to various aspects of a constituent portion, such as the kind of information being conveyed by data in the constituent portion, format or organization of the data in the constituent portion, etc. In various embodiments, the facility determines the data type of a constituent portion based on, for example, column heading, column metadata stored in the table, column metadata stored outside the table, automatic sampling or inference applied to the data contained by the column, etc.

For each of at least some of these constituent portions, the facility determines a deidentification operation to perform against the constituent portion, such as based on the data type determined for it. In various embodiments, the deidentification operations applied by the facility to various data types include various combinations of procedural deidentification operations, such as entity hashing that preserves data type; date shifting; zip code truncation; masking patient identifiers discovered by a machine learning model; column categorization to determine what deidentification operation will be performed on that column that uses a policy override table; and the use of a faker file containing false data substituted for real data.

In some embodiments, the facility applies "NLP inference" deidentification operations in which named entity recognition deep learning models are used to identify in text strings contained by a constituent portion named entities that constitute identifiers, or indicate the presence of adjacent identifiers. In some embodiments, the facility uses a sequence of different models to perform this analysis. In some embodiments, the facility obfuscates these identified named entities by replacing each with a dummy entity of the same type, such as replacing an identified phone number with a dummy phone number.

The facility dispatches each constituent portion to the appropriate deidentification agent to perform the determined identification operation against it, then collects these deidentification results into a deidentified version of the data object, such as by collecting the deidentified columns into a deidentified table. In some embodiments, the facility dispatches inference-based natural language processing the identification operations to a specialized NLP inference infrastructure, and other, procedural identification operations to a procedural deidentification processor. In some embodiments, one or both of the facility's the identification agents caches the results of some or all earlier de-identification operations to avoid committing processing resources to unnecessarily repeating deidentification operations, and to provide correlation in the deidentified data of replacement identifiers in cases where the replaced identifiers would have correlated.

In some cases, the system separately retains information that is usable to at least partially reverse this transformation, to at least partially recover the pre-transformed data. Techniques used for the transformation include various combinations of entity hashing that preserves data type; date shifting; zip code truncation; masking patient identifiers discovered by a machine learning model; column categorization using a policy override table; and the use of a faker file containing false data substituted for real data.

By operating in some or all of the ways described above, the facility efficiently performs effective deidentification of personal information, in some cases in ways that are partially or fully reversible, and/or in ways that preserve the cancellation of identifiers in the deidentified data, and/or preserve the relative temporal relationships among different data, such as those relating to the same person.

Additionally, the facility improves the functioning of computer or other hardware, such as by reducing the processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by caching some or all of the obfuscation substitutions that it performs, the facility conserves the computing resources that would be needed to repeat them.

Further, for at least some of the domains and scenarios discussed herein, the processes described herein as being performed automatically by a computing system cannot practically be performed in the human mind, for reasons that include that the starting data, intermediate state(s), and ending data are too voluminous and/or poorly organized for human access and processing, and/or are a form not perceivable and/or expressible by the human mind; the involved data manipulation operations and/or subprocesses are too complex, and/or too different from typical human mental operations; required response times are too short to be satisfied by human performance; etc. For example, the facility's application of machine learning models by its inference pipeline involves performing matrix multiplication of giant matrices that can each contain tens of thousands of values, which is beyond the ability of a human mind to manage.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102—such as RAM, SDRAM, ROM, PROM, etc.—for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. None of the components shown in FIG. 1 and discussed above constitutes a data signal per se. While computer systems configured as described above are typically used to support the operation of the facility, those skilled in the art will appreciate that the facility may be implemented using devices of various types and configurations, and having various components.

Figure 2:
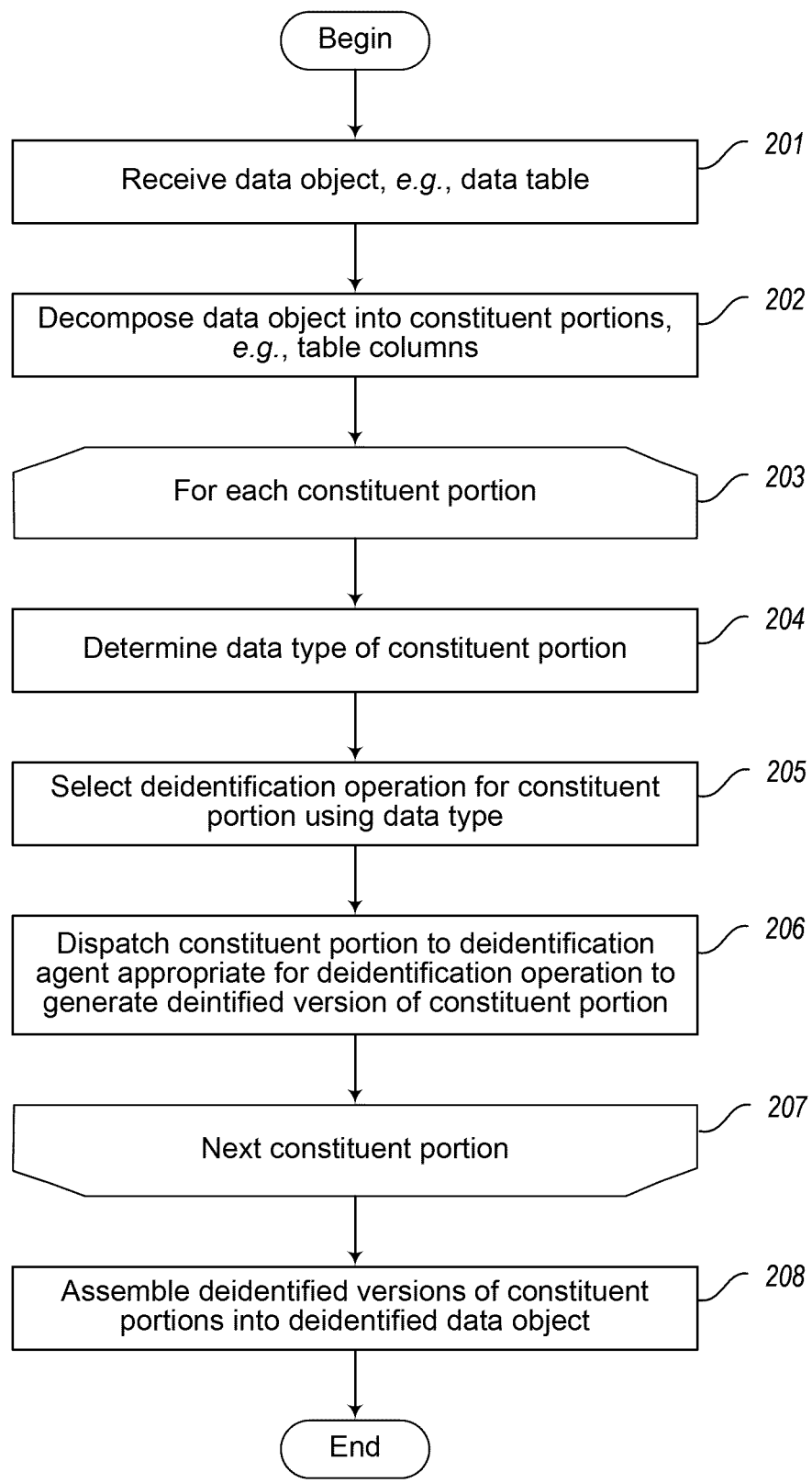
FIG. 2 is a flow diagram showing a process performed by the facility in some embodiments in order to deidentify the contents of a data object such as a data table.

FIG. 2 is a flow diagram showing a process performed by the facility in some embodiments in order to deidentify the contents of a data object such as a data table. In act 201, the facility receives a data object for deidentification. In various embodiments, the facility receives data objects in response to their creation; their update; the expiration of a periodic timer; receiving a push or pull share request for sharing the data object with a particular recipient or group of recipients; etc. In some embodiments, the data object is a table involved in providing care to a population of medical patients.

In act 202, the facility decomposes the data object into constituent portions whose approach to deidentification may vary, such as individual columns or groups of columns of a data table.

In acts 203-207, the facility loops through each constituent portion identified in act 202. In act 204, the facility determines a data type of the constituent portion. In various embodiments, the facility determines the data type of a constituent portion based on, for example, a column heading, column metadata stored in the table separate from the column heading, column metadata stored outside the table in another information resource, automatic sampling or inference applied to the data contained by the column, manual identification or ratification, etc.

In act 205, the facility selects a deidentification operation for the constituent portion based upon the data type determined for the constituent portion in act 204.

In some embodiments, the facility performs deidentification operations that include the following: entity hashing, date shifting, zip code truncation, natural language processing, and masking. These are described in greater detail below.

Entity Hashing that Preserves Data Type: Entity Hashing applies the SHA-256 hash function to encrypt data in a given field. Secure Hash Algorithm 2 (SHA-2) is a set of cryptographic hash functions designed by the United States National Security Agency. The SHA-2 algorithm returns a hash string that masks the input string. In some embodiments, the facility uses hash functions selected from among several hash functions within the SHA-2 family depending upon the desired bit length of the hash output. The SHA-2 hash functions that returns 256 bits long string is called the SHA-256 hash function. The SHA-256 is a one-way checksum algorithm, meaning that the same input will always generate the same output.

The SHA-256 one-way encryption reduces the risk of identification of the output string to near zero. However, publicly released encrypted data may still pose some risk of identification. Consider a hypothetical scenario where a hacker releases the original patient ID that was used to generate the SHA-256 encrypted output. Theoretically, such information can be used to reidentify the patient by applying the SHA-256 algorithm to the hacked patient's ID. To alleviate the risk of such scenarios, the structured data deidentification methodology modifies the input string by appending a random number to the input string and then encrypting the random input string using the SHA-256 algorithm. This practice reduces the risk of identification of encrypted output to near zero. An example below explains the random SHA-256 masking methodology.

Consider a hypothetical scenario where patient ID is 123456. The SHA-256 encrypted value of this ID is: 3bc51062973c458d5a6f2d8d64a023246354ad7e064b1e4e 009ec8a0699a3043.

If a hacker releases the patient ID: 123456, it can be used as an input to the SHA-256 encryption algorithm to generate the hash value: 3bc51062973c458d5a6f2d8d64a023246354ad7e064b1e4e 009ec8a0699a3043.

As a result, all records released to public with encrypted Patient ID 3bc51062973c458d5a6f2d8d64a023246354a d7e064b1e4e009ec8a0699a3043 can be identified.

In some embodiments, the facility adds a random number to the patient ID string: 123456. For example, a random number 48523759 is added to patient ID string 123456 resulting in a new string 123456+48523759. The modified patient ID is then encrypted using the SHA-256 algorithm as cd9fb1e148ccd8442e5aa74904cc73bf6fb54d1d54d333bd5 96aa9bb4bb4e961.

As a result, even if the hypothetical hacker releases the patient ID, it is impossible to reconstruct the encrypted hash key. The reconstructed hash key will point to patient ID: 123456+48523759 rather than the patient ID: 123456.

In addition, the hashing process returns an output of the same datatype as the original data. For example, strings are replaced by string hash, integers are replaced by an integer hash, etc. In sum, hashing minimizes the risk of reidentification, while maintaining the referential integrity of the dataset and the original datatypes of the hashed fields.

Date Shifting: To preserve the temporal relationships between events, in some embodiments, the facility shifts date values for a given patient when possible using the following methods: patient-specific date shifting and truncation to the first of the year.

Patient Specific Random Date Shifting—in some embodiments, the date shifting is applied to all columns containing patient specific dates, excluding date of birth and date of death. Each patient is assigned a date shift number. The date shift number is randomly selected between 1 to 364 and (−1) to (−364). This number is applied to all patient specific dates. For example, a date of admission of Apr. 3, 2019 for a patient with a 30-day date shift would be changed to May 3, 2019. All other dates related to that patient would also be shifted by 30 days.

Date Truncation to Year—date of birth and date of death are particularly sensitive because they are more readily available in public datasets than other patient specific dates. In the structured data fields, these are truncated to the first of the year (01-01-YEAR). For example, date of birth of Feb. 4, 1950 and date of death Dec. 29, 2020 are replaced with Jan. 1, 1950 and Jan. 1, 2020. Dates that are not patient specific are also resolved to the first month of the year in the original date. Dates without an explicit policy in the Deidentification Override Policy table are truncated to year by default.

Zip Code Truncation—zip codes are truncated in all columns containing ZIP codes of patients or their relatives, household members, or employers. In accordance with the Safe Harbor method, ZIP codes can be truncated to the first three digits, if there are more than 20,000 people residing within the geographic unit created by the truncated ZIP. If the geographic unit of the truncated ZIP codes has 20,000 or fewer people, the first three digits of the ZIP code are changed to 000. Foreign ZIP or postal codes are truncated to 000.

Natural Language Processing (NLP): Text fields that have undergone the sampling, annotation, and evaluation process are deidentified using deep learning models that can flag patient identifiers in the text. The flagged identifiers are then obfuscated or masked. The technology and process used to deidentify text data is explained in greater detail in below.

Masking: Text fields that have not undergone sampling, annotation, and evaluation may be masked instead of hashed to save processing time. Masking involves removing all the original text in these fields and replacing it with a string indicating that the contents have been masked.

Keep: Data types labeled as "keep" do not require any deidentification because they do not contain patient identifiers.

Figure 3:
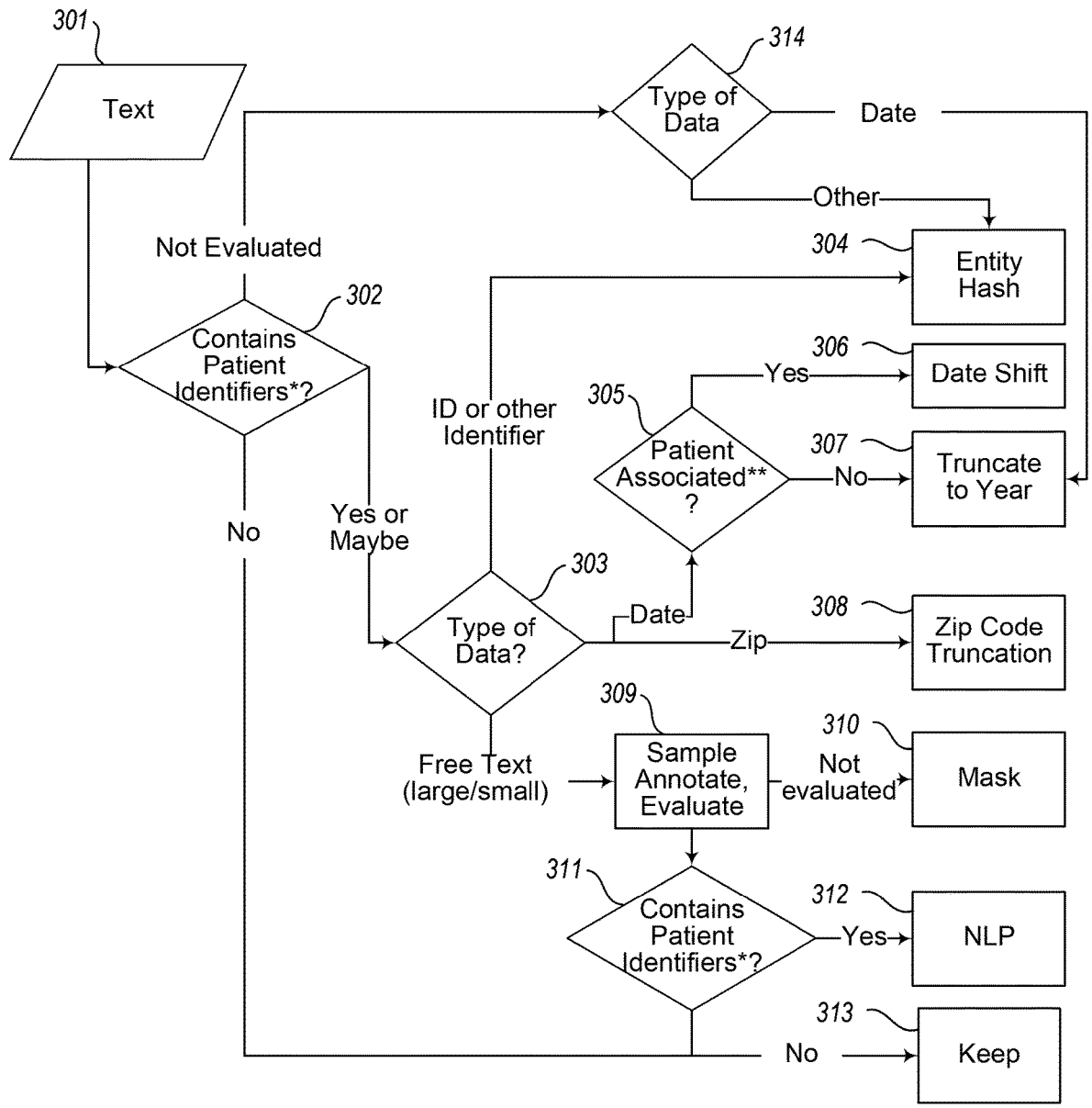
FIG. 3 is a flow diagram showing a process performed by the facility in some embodiments to select a deidentification operation for a constituent portion having textual contents.

FIG. 3 is a flow diagram showing a process performed by the facility in some embodiments to select a deidentification operation for a constituent portion having textual contents. In act 302, the facility branches based upon the nature of text 301: if the text does or may contain patient identifiers, then the facility continues in act 303; if the text does not contain patient identifiers, then the facility continues in act 313; and if the question of whether the text contains patient identifiers is not evaluated, then the facility continues in act 314.

In act 303, where the text does or may contain patient identifiers, the facility branches on data type: if the data type is identifier, the facility continues in act 304; if the data type is date, then the facility continues in act 305; if the data type is zip code, then the facility continues in act 308; if the data type is free text, the facility continues in act 309. In act 304, where the data is an identifier, the facility selects the entity hashing operation described above. This process then concludes. In act 305, where the type of data is date, if the date is associated with a patient, then the facility continues in act 306, else the facility continues in act 307. In act 306, the facility selects a date shift operation as described above, and this process concludes. In act 307, the facility selects a truncation operation of the date to its year, and this process concludes. In act 308, where the data is a zip code, the facility selects a zip code truncation operation as described above, and this process concludes. In act 309, where the data is free text, then the facility samples, annotates, and/or evaluates the data. If the data is successfully evaluated, then the facility continues in act 311, else the facility continues in act 310. In act 310, where the free text data is not evaluated, the facility selects a mask operation, and this process concludes. In act 311, where the free text is successfully evaluated, if the free text contains patient identifiers, then the facility continues in act 312, else the facility continues in act 313. In act 312, where the free text contains patient identifiers, the facility selects the NLP deidentification operation, and this process concludes. In act 313, where the free text does not contain patient identifiers, the facility selects to keep the free text, i.e., selects to perform a null deidentification operation, and this process concludes.

Those skilled in the art will appreciate that the acts shown in FIG. 3 and in each of the flow diagrams discussed herein may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Returning to FIG. 2, in act 206, the facility dispatches a constituent portion to a deidentification agent of the facility appropriate for the deidentification operation selected in act 205 to generate a deidentified version of the constituent portion. This dispatch is discussed in greater detail below in connection with FIG. 4. In act 207, if additional constituent portions remain to be processed, the facility continues in act 203 to process the next constituent portion. In act 208, the facility assembles the deidentified versions of the constituent portions into a deidentified version of the data objects, which is various stored, shared, transmitted, etc. After act 208, this process concludes.

Figure 4:
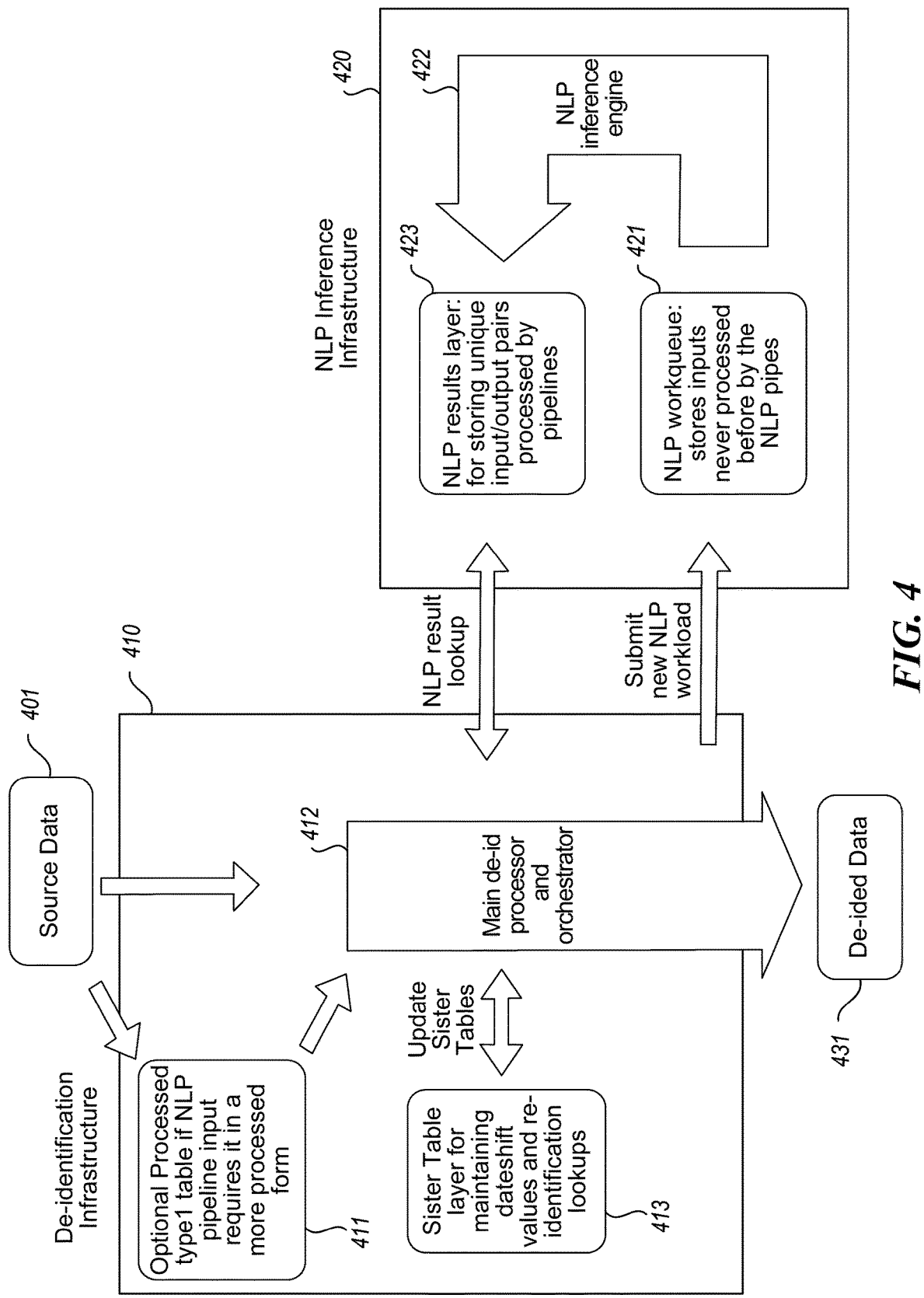
FIG. 4 is a data flow diagram showing the facility's dispatch of constituent portions of the data object for the performance of the identification operation selected for those portions.

FIG. 4 is a data flow diagram showing the facility's dispatch of constituent portions of the data object for the performance of the identification operation selected for those portions. In this diagram, rounded boxes represent storage, and arrows represent computing processes. The facility accesses source data 401 in its deidentification infrastructure 410. In some embodiments, the deidentification infrastructure performs optional processing to the source data to facilitate its consumption by the facility's NLP inference infrastructure 420. The source data is assessed by a main deidentification processor and orchestrator 412, which performs the process shown in FIG. 2 and described above. For some constituent portions of the data object, the deidentification processor and orchestrator itself performs the selected deidentification operation-such as for procedural deidentification operations not involving machine learning; in other cases, the main deidentification processor and orchestrator dispatches constituent portions to the NLP inference infrastructure as a separate deidentification agent. As part of the main deidentification processor and orchestrator's performance of deidentification operations, it accesses and updates one or more sister tables 413. These sister tables maintain data needed to reverse some or all of the deidentification operations performed against the source data, and/or perform repeatable transformations of the source data in future deidentification operations. For example, the sister table can contain, for each person, date shifting increments used to shift all of that person's dates. In some embodiments, sister tables also contain supplemental data needed to reverse identifier hashing operations to recover original identifiers for a person.

When the main deidentification processor and orchestrator submits a new natural language processing workload to the NLP inference infrastructure, the NLP inference infrastructure determines, for each item in the constituent portion—such as each field in the column—whether NLP results have already been generated by the NLP inference infrastructure for that item. In some embodiments, the facility does this by generating a hash value representing the item, and comparing it to a table that maps from these hash values to NLP results. In cases where NLP results are available based upon a match of the hash values, these are immediately made available for recovery by the main deidentification processor and orchestrator in an NLP result lookup operation. Remaining items of the constituent portion are submitted to an NLP inference engine 422. The NLP inference engine applies a pipeline sequence of deidentification suboperations, discussed below in connection with FIG. 5. In some embodiments, the facility uses parallel processing techniques in this NLP inference engine, such as by assigning a streaming swarm of single node data bricks machines. This streaming sends a single record at a time to each of the single node clusters or swarms. In some cases, the NLP inference engine delegates these data elements to particular single node machines using a Pyspark script. The NLP inference engine stores the results of processing these data items of the constituent portion in an NLP results layer 423, together with hash values it generates based upon the contents of each data item. These are available in an NLP results layer to be retrieved for this source data set by the main deidentification processor and orchestrator, and also to be retrieved by the main deidentification processor and orchestrator for the same data items encountered in future source data sets.

The main deidentification processor and orchestrator collects the deidentification results for the source data object to produce deidentified data 431, i.e., a deidentified version of the source data object.

Figure 5:
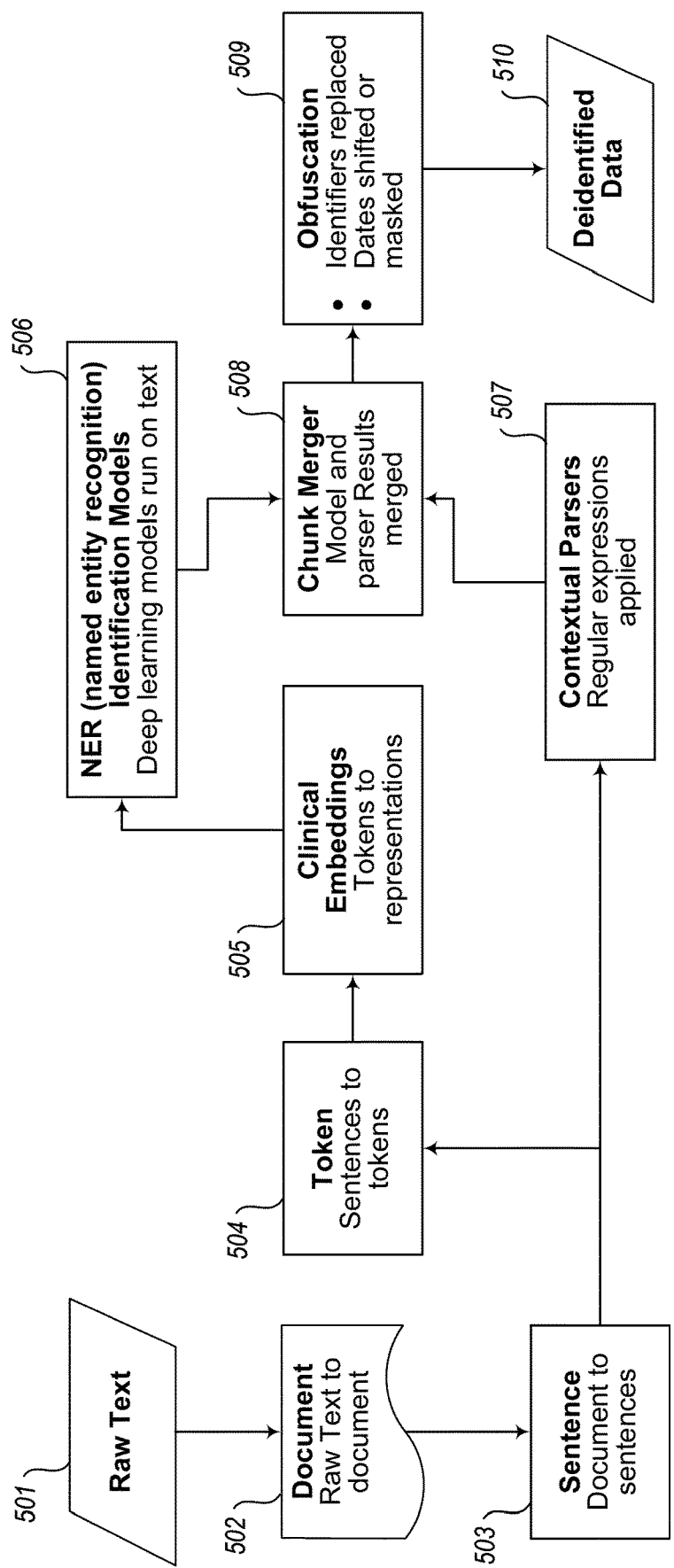
FIG. 5 is a data flow diagram showing a sample text deidentification pipeline sequence used by the facility in its NLP inference engine in some embodiments.

FIG. 5 is a data flow diagram showing a sample text deidentification pipeline sequence used by the facility in its NLP inference engine in some embodiments. A document module 502 receives raw text 501 and converts it to a document that can be acted on by downstream modules. Then a sentence module 503 splits the document into individual sentences. Then a token module 504 splits individual sentences into the tokens that make them up. In some embodiments, these tokens are words, or the approximate equivalent of words. Then a clinical embeddings module 505 converts each token into a numerical representation that codes the token's meaning and context. One or more NER (named entity recognition) identification models 506 act on the clinical embeddings, such that the models are run sequentially on the text. These models are trained to predict whether a token is an entity of interest, such as an explicit or implicit identifier of a person. In various embodiments, the facility uses model architectures for named entity recognition deidentification in accordance with those described by Brown, L. D. (2001), Interval Estimation for a Binomial Proportion, *Statistical Science*, Vol 16, No. 2, 101-133; Dernoncourt, F., Lee, J., & Szolovits, P. (2017), de-identification of patient notes with recurrent neural networks, *JAMIA*, 24(3):596-606; Khin, K., Burckhardt, P., & Padman, R. (2018), a deep learning architecture for deidentification of patient notes: Implementation and evaluation, *Computing Research Repository arXiv*, Retrieved from arxiv.org/abs/1810.01570; and/or Liu, Z., Tang, B., Wang, X., & Qingcai, C. (2017), deidentification of clinical notes via recurrent neural network and conditional random field, *Journal of Biomedical Informatics*, 75(3):S34-S42. Each of these documents is hereby incorporated by reference in its entirety. In cases in which a document incorporated herein by reference conflicts with the present application, the present application controls.

In parallel with the NER identification modules, a contextual parsers module 507 applies regular expressions to the text defined entities missed by the models. A chunk merger module 508 merges the results produced by the NER identification models module and the contextual parsers module. An obfuscation module 509 replaces identifiers flagged in the merged results with artificial data, and masks or shifts the dates as appropriate, to produce the identified data 510.

Obfuscation is the process of replacing the flagged identifiers (PHI entities) with dummy data. For example, the name "Carey Smith" is replaced with "Ellie Brown" or a phone number like "602-358-7890" is replaced with "780-568-3094". This step reduces the risk of reidentification by making it difficult for an attacker to distinguish between fake identifiers and authentic identifiers that may have been missed.

DATE entities in formats recognized by the software are shifted by the days randomly specified for that patient. DATE entities in formats that cannot be parsed are masked. For example, Apr. 5, 2019 for a patient with a 30-day date shift is changed to May 5, 2019. However, a Mar. 4, 2020 might simply be replaced with <DATE>because it is not clear whether the year is 2020 or 1920. The following is an example of patient note before and after deidentification, based on a real patient note and the actual performance of the PHS text deidentification pipeline.

TABLE 1

EXAMPLE OF A PATIENT NOTE BEFORE AND AFTER DEIDENTIFICATION WITH OBFUSCATION

| Patient Note Before Deidentification | Patient Note After Deidentification |
| --- | --- |
| Swedish Medical Center Progress Note Patient Name: Christine L Kraton Age: 74 y.o. DOB: Sep. 3, 1942 Medical Record Number: 20008970125 Date of admission: 4/26/2020 Attending Physician: Albert John Green, MD Assessment and Plan: 1. S/p laparoscopic hemicolectomy: chronic sigmoid diverticulitis, surgery on 7/21/20. 2. Antiphospholipid antibody syndrome: symptomatic with TIA/stroke in 2018, managed on Xarelto 20 mg/d 3. New onset diabetes mellitus: On lantus 5 units daily 4. Aortic stenosis: clinically stable. Plan: Patient able to resume full dose anticoagulation per surgery. | Op Providence St Mary Medical Center Progress Note Patient Name: Charles Bush Age: 74 y.o. DOB: Mar. 2, 1942 Medical Record Number: I58080210 Date of admission: 10/24/2019 Attending Physician: Christian Randall, MD Assessment and Plan: 1. S/p laparoscopic hemicolectomy: chronic sigmoid diverticulitis, surgery on 1/18/20. 2. Antiphospholipid antibody syndrome: symptomatic with TIA/stroke in 2018, managed on Xarelto 20 mg/d 3. New onset diabetes mellitus: On lantus 5 units daily 4. Aortic stenosis: clinically stable. Plan: Patient able to resume full dose anticoagulation per surgery. |

In some embodiments, dates that cannot be normalized are masked instead of shifted.

Fake data should be as realistic and diverse as possible to minimize the risk of reidentification. For example, if all names are replaced by simply a small handful of fake names in a very large dataset, an attacker can easily distinguish between the real and fake names. Also, phone numbers replaced by fakes that do not look authentic allow real ones to be distinguished from the fakes. Consequently, in some embodiments the facility uses carefully designed obfuscation policies for each entity type, to maximize the diversity and representativeness of the fake data shown in Table 2 below. The fake data is pulled from a 'faker file,' which consists of data generated by a software program and data from Providence.

Details Regarding Obfuscation:
  In some embodiments, the models do not distinguish between patient related and non-patient related identifiers. For example, all zip codes are tagged and obfuscated, even if they are not associated with the patient.
  In some embodiments, certain entities that are not patient identifiers, such as HOSPITAL and ORGANIZATION are obfuscated to increase recall on identifiers such as PATIENT or patient location related information. Sometimes the model mistakenly tags patient and location related information entities such as names of health facilities and organizations.
  In some embodiments, the facility utilizes a custom faker file automatically generated by the Faker Python package and the JSL faker file to further maximize diversity of fake data.

TABLE 2

Entity Obfuscation Strategies

| ENTITY LABEL | OBFUSCATION STRATEGY |
| --- | --- |
| CITY | Create from a combination of completely fake town and city names by the Faker Python package and real names from Providence patient data. The top 500 most common real city names are added to this list. The 500th most common real city name has over 13,000 patients in Providence's system. |
| DATE | Dates that can be normalized are shifted; those that cannot are replaced with <DATE> in the text. |
| DEVICE | Use JSL faker file |
| DOCTOR | Use JSL faker file |
| EMAIL | Randomly generate using the Faker Python package |
| FAX | Merge into the PHONE entity before obfuscating. See PHONE for more details |
| HEALTHPLAN | Merge into the IDNUM entity before obfuscating. See IDNUM for more details |
| HOSPITAL | A complete list of Providence's places of service that are categorized as hospitals is pulled to create this list. This list contains approximately 2,000 individual facility names. |
| IDNUM | Randomly generate ID numbers in the following formats: 123456789 A12345 12345678 A12345678 |
| MEDICALRECORD | Merge into the IDNUM entity before obfuscating. See IDNUM for more details. |
| NAME | Generate with the Faker Python package in a variety of different formats to reflect the diversity of formats in the text data. Formats First Last Last, First LAST, FIRST First FIRST Last, First MI LAST, FIRST MI Reflects Hispanic and non-Hispanic names common in the United States, and small proportions of names from the following locales: Non-US Locales Represented Philippines India Thailand Canada Ireland Australia England |
| ORGANIZATION | Randomly generate Company names using the Faker Python package. |
| PATIENT | Merge into the NAME entity before obfuscating. See NAME for more details. |
| PHONE | Randomly generate various formats using the Faker Python package. |
| STATE | Use JSL faker file. |
| STREET | Randomly generate using the Faker Python package |
| URL | Randomly generate using the Faker Python package. |
| USERNAME | Randomly generate using the Faker Python package. |
| ZIP | Randomly generate using the Faker Python package. |

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more instances of computer-readable media collectively having contents configured to cause a computing system to perform a method, the method comprising:
   receiving a data object;
   identifying in the data object a plurality of constituent portions;
   selecting a first constituent portion of the data object containing one or more free text strings;
   in a first computing mechanism:
      for each free text string:
         subjecting the free text string to a trained machine learning model to predict occurrence within the free text string of a personal identifier based on predicting occurring within of certain named entities;
         in a repeatable manner, generating a substitute personal identifier from the predicted personal identifier;
         creating a copy of the free text string;
         in the free text string copy, replacing the predicted personal identifier with the generated substitute personal identifier;
      after the replacement, collecting the free text string copies in a modified version of the first constituent portion;
   selecting a second constituent portion of the data object distinct from the first constituent portion containing data items of a type other than free text strings;
   in a second computing mechanism distinct from the first computing mechanism:
      for each data item:
         in a repeatable manner, generating a substitute data item from the data item;
      collecting the substitute data items in a modified version of the second constituent portion; and
   assembling the modified version of the first constituent portion and modified version of the second constituent portion into a modified version of the data object,
   wherein the subjecting subjects the free text string to a plurality of trained machine learning models in sequence to collectively predict occurrence within the free text string of a personal identifier based on predicting occurring within of certain named entities.

2. The one or more instances of computer-readable media of claim 1, the method further comprising:
   in the first computing mechanism:
      for each free text string:
         before the subjecting:
            identifying tokens in the free text string;
            determining semantic embeddings representing the identified tokens;
            in the free text string, substituting the determined semantic embeddings for the identified tokens.

3. The one or more instances of computer-readable media of claim 1, the method further comprising:
   in the first computing mechanism:
      for each free text string:
         performing procedural pattern matching in the free text string to predict occurrence within the free text string of a personal identifier based on occurrence within the free text string of substrings matching predetermined text patterns;
         in a repeatable manner, generating a substitute personal identifier from the personal identifier predicted based on the pattern matching; and
         in the free text string copy, replacing the personal identifier predicted based on the pattern matching with the substitute personal identifier generated from the personal identifier predicted based on the pattern matching.

4. The one or more instances of computer-readable media of claim 1, the method further comprising:
   for each free text string, after the replacement:
      repeatably determining a hash value for the free text string;
      persistently storing a mapping between the determined hash value and the copy of the free text string; and
   for each free text string, before the subjecting, generating, creating, and replacing:
      repeatably determining a hash value for the free text string;
      determining whether the determined hash value occurs among the persistently-stored mappings;
      if the determining determines that the determined hash value occurs among the persistently-stored mappings, collecting the copy of the free text string mapped-to from the determined hash value into the modified version of the first constituent portion without performing the subjecting, generating, creating, and replacing; and
      only if the determining determines that the determined hash value does not occur among the persistently-stored mappings, performing the subjecting, generating, creating, and replacing.

5. The one or more instances of computer-readable media of claim 1 wherein the level of computing resources consumed in the first computing mechanism scales linearly with the volume of data objects in which a first constituent portion is selected.

6. The one or more instances of computer-readable media of claim 1 wherein the subjecting is performed by streaming individual free text strings through a swarm of single processing nodes of the first computing mechanism.

7. A method in a computing system, comprising:
   receiving a first data object;
   identifying in the first data object a plurality of constituent portions;
   for each of the constituent portions identified in the first data object:
      identifying a type of data items occurring within the constituent portion;
      on the basis of the identified data item type, selecting a deidentification operation;
      causing the selected deidentification operation to be performed on the data items of the constituent portion, such that these data items are modified to make the data items less identifiable with a person, and/or less-harmfully identifiable with a person;

after the causing, assembling the constituent portions containing the modified data items into a modified version of the first data object;
for each of at least one of the constituent portions identified in the first data object:
persistently storing mappings between the data items contained by the constituent portion and the corresponding modified data items; and
receiving a second data object;
identifying in the second data object a plurality of constituent portions;
for each of the constituent portions identified in the second data object:
identifying a type of data items occurring within the constituent portion;
on the basis of the identified data item type, selecting a deidentification operation;
for each of the data items mapped to a corresponding modified data item among the mappings, adopting the mapped-to modified data item;
for each of the data items not mapped to a corresponding modified data item among the mappings, causing the selected deidentification operation to be performed on the data items of the constituent portion, such that these data objects are modified to make the data items less identifiable with a person, and/or less-harmfully identifiable with a person; and
after the adopting and causing, assembling the constituent portions containing the adopted and modified data items into a modified version of the second data object.

8. The method of claim 7 wherein, for each of at least one distinguished constituent portion among the identified constituent portions, a deidentification operation is selected that replaces data objects with artificial data objects of the type identified in the distinguished constituent portions contained by an automatically-generated faker file.

9. The method of claim 7 wherein, for at least one of the identified constituent portions, the selected deidentification operation is deterministic, such that each time it is performed on a particular data item, the same modified data item results.

10. The method of claim 9 wherein a data item contained by the first data object is a distinguished identifier, for which a distinguished modified data item that is the modified distinguished identifier is included in the modified version of the first data object,
and wherein, when the method is repeated with respect to a second data object containing a data item that is the distinguished identifier, the modified version of the second data object contains the distinguished modified data item,
such that the modified distinguished identifier occurs in both the first and second data objects, and can be correlated between the first and second data objects.

11. The method of claim 7 wherein, for each of one or more distinguished ones of the identified constituent portions, the deidentification operation that is caused to be performed can be reversed for a data item based upon the corresponding modified data item and additional data, the method further comprising:
for each distinguished constituent portion:
for each data item of the distinguished constituent portion:
persistently storing the additional data.

12. The method of claim 11 wherein the deidentification operation that is caused to be performed for one of the distinguished constituent portions is a date shift deidentification operation, and the additional data is a number of days.

13. The method of claim 12 wherein the number of days is stored for each of a plurality of people.

14. The method of claim 11 wherein the deidentification operation that is caused to be performed for one of the distinguished constituent portions containing identifiers is a mapping between the identifier and a one-way hash result determined for the identifier.

15. The method of claim 7 wherein the causing causes the selected the identification operation to be performed by a first computing mechanism for constituent portions whose data items are of data item types among a first set of data item types, and wherein the causing causes the selected the identification operation to be performed by a second computing mechanism distinct from the first computing mechanism for constituent portions whose data items are of data item types among a second set of data item types.

16. The method of claim 15 wherein the second computing mechanism performs named entity recognition using one or more machine learning models.

17. The method of claim 7 wherein the selection is performed with reference to an override table.

18. A system, comprising:
at least one processor; and
one or more memories, the one or more memories having contents configured to, when executed by the at least one processor, cause the system to perform a method, the method comprising:
receiving a sequence of data objects;
for each received data object:
identifying in the data object a plurality of constituent portions;
for each of the constituent portions identified in the data object:
identifying a type of data items occurring within the constituent portion;
on the basis of the identified data item type, selecting a deidentification operation such that, among the plurality of constituent portions, the de-identification operation selected for one or more distinguished ones of the constituent portions is a deterministic identification operation that produces the same result every time it is applied to a particular data item;
causing the selected deidentification operation to be performed on the data items of the constituent portion, such that these data items are modified to make the data items less identifiable with a person, and/or less-harmfully identifiable with a person; and
after the causing, assembling the constituent portions containing the modified data items into a modified version of the data object,
such that, for a first and a second data object of the sequence that both contain a distinguished data item in one of the distinguished constituent portions, the modified versions of first and second data objects contain the same modified data item corresponding to the distinguished data item.

19. The system of claim 18 wherein, for each of the first and second data objects, for each of at least one of the distinguished constituent portions, the deidentification operation that is caused to be performed can be reversed for a data item based upon the corresponding modified data item and additional data, the method further comprising:
  for each distinguished constituent portion:
    for each data item of the distinguished constituent portion:
      persistently storing the additional data.

20. The system of claim 19 wherein the deidentification operation that is caused to be performed for one of the distinguished constituent portions is a date shift deidentification operation, and the additional data is a number of days.

21. The system of claim 19 wherein the number of days is stored for each of a plurality of people.

22. The system of claim 19 wherein the deidentification operation that is caused to be performed for one of the distinguished constituent portions containing identifiers is a mapping between the identifier and a one-way hash result determined for the identifier.

* * * * *